United States Patent
Huang

[11] Patent Number: 5,939,627
[45] Date of Patent: Aug. 17, 1999

[54] TIRE PRESSURE GAUGE WITH ADJUSTABLE EXTENSION MEMBER

[76] Inventor: Tien-Tsai Huang, No. 4, Lane 30, Wu-Chuan St., Pan-Chiao City, Taipei Hsien, Taiwan

[21] Appl. No.: 08/984,760

[22] Filed: Dec. 4, 1997

[30] Foreign Application Priority Data

Apr. 30, 1997 [TW] Taiwan ................................. 86206901

[51] Int. Cl.⁶ .................................................. B60C 23/02
[52] U.S. Cl. .......................................................... 73/146.8
[58] Field of Search ................................ 73/146.3, 146.8, 73/146.2; 340/442, 443, 444, 445, 447

[56] References Cited

U.S. PATENT DOCUMENTS 5,365,967  11/1994  Moore ..................................... 73/146.8
5,554,803   9/1996  Huang ..................................... 73/146.8

Primary Examiner—William Oen
Attorney, Agent, or Firm—Fish & Richardson P.C.

[57] ABSTRACT

A tire pressure gauge includes a tubular housing, a pressure measuring head connected to one end of the tubular housing, a pressure responsive piston provided inside the tubular housing and biased by a spring towards a pressure inlet hole of the pressure measuring head, and a plunger actuated by the piston and having a portion that extends out of the other end of the tubular housing. An adjustable extension member, which is disposed between the piston and the plunger, is connected to the plunger to adjust the length of the outwardly extending portion of the plunger or to correct the position of the graduations provided on the plunger relative to a pointing end of the tubular housing where a detected pressure is read. Preferably, the adjustable extension member is a screw member which is threadedly connected to the plunger. Adjustment or correction can be made before or after assembly by turning the screw member relative to the plunger.

7 Claims, 4 Drawing Sheets

TIRE PRESSURE GAUGE WITH ADJUSTABLE EXTENSION MEMBER

BACKGROUND OF THE INVENTION

1. Field of the Invention

This invention relates to a pressure gauge, more particularly to a tire pressure gauge having correction means to correct the position of a pressure responsive plunger.

2. Brief Description of the Related Art

Conventional tire pressure gauges are generally provided with a pressure responsive movable indicator rod to indicate the pressure value that is detected thereby. Referring to FIG. 1, a conventional tire pressure gauge comprises a tubular housing 10, a pressure measuring head 11, a piston 12, a spring 13, a hollow guide 14, and a plunger or graduated pressure indicator 15. When measuring the pressure inside a tire, the pressure measuring head 11 is connected to an inflating valve (not shown) of the tire so that the gas in the tire enters the pressure gauge and pushes the piston 12, which in turn moves the pressure indicator 15 out of the tubular housing 10 against the biasing action of the spring 13. The pressure inside the tire is read from the graduation of the pressure indicator 15 which is aligned with a pointer, i.e. the bottom end of the hollow guide member 14 or the bottom end of the tubular housing 10. After reading, the pressure indicator 15 is pushed inward manually to revert to its original position.

In manufacturing such piston-type pressure gauges, springs with a proper design are chosen, and graduations are provided on pressure indicators based on a predetermined relationship between the force of the spring used and the amount of the spring displacement. It is necessary that the springs are produced with uniform quality so that a precise pressure value can be read from the pressure indicators. However, in practice, quality deviation often occurs in producing the springs because it is difficult to obtain uniform quality of springs even under the same controlled condition. Since unqualified products are discarded after a stringent quality inspection, the cost of manufacturing such pressure gauges usually cannot be kept low. An approach to reduce the manufacturing cost is to reduce the amount of springs to be discarded by allowing a wider tolerance range for the springs and by providing correction means for maintaining the precision of the pressure indicators.

SUMMARY OF THE INVENTION

It is an object of the invention to provide a tire pressure gauge with correction means so that adjustment or correction can be made, before or after assembly, to maintain the precision of the pressure gauge, even if the characteristics of a spring used therein deviate from the preset standard, thereby reducing the amount of waste and lowering the cost of manufacture.

The object of the present invention can be achieved by a tire pressure gauge which comprises a tubular housing, a pressure measuring head connected to a first end of the tubular housing and having a pressure inlet hole communicated with the tubular housing, a piston mounted movably inside the tubular housing adjacent to the pressure inlet hole for longitudinal movement in response to a pressure introduced through the pressure inlet hole, a fixed hollow guide disposed at a second end of the tubular housing, and a plunger extending longitudinally in the tubular housing and having a driven end disposed adjacent to the piston. The plunger further has a guided end extending through the hollow guide and out of the second end of the tubular housing. An adjustable extension member is disposed between the driven end and the piston and is connected to the driven end for adjusting and correcting the length of the plunger that extends out of the second end of the tubular housing. A spring is mounted inside the tubular housing around the plunger between the piston and the hollow guide member for biasing the piston against the pressure inlet hole.

Preferably, the adjustable extension member comprises a headed screw member which has a portion threadedly connected to the driven end of the plunger.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
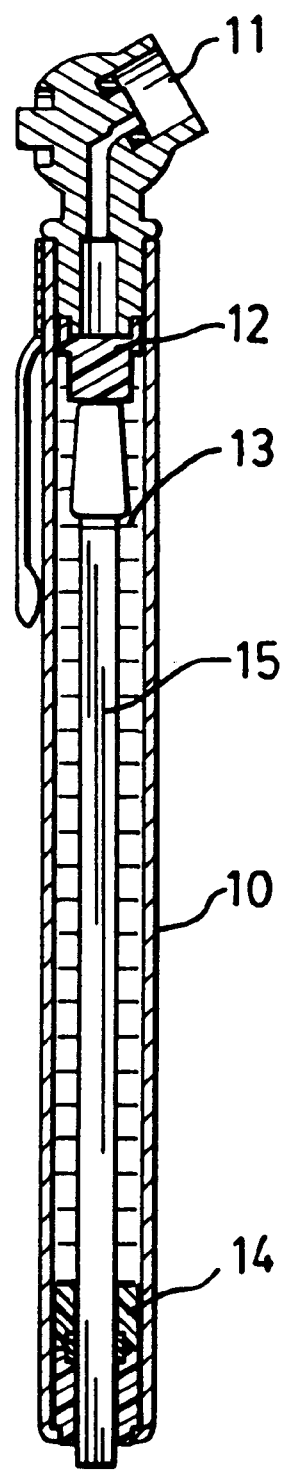
FIG. 1 shows a conventional tire pressure gauge.
Figure 2:
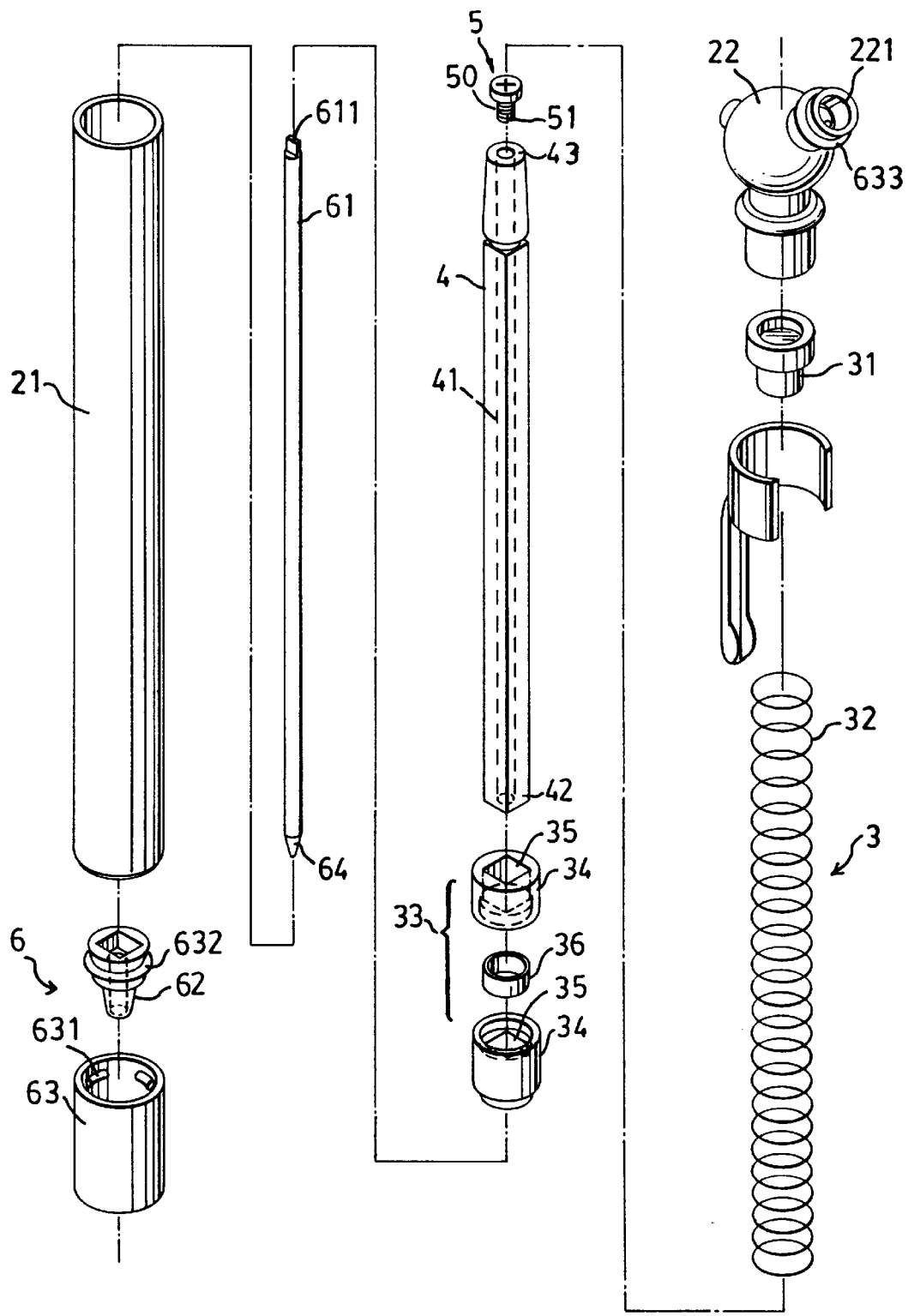
FIG. 2 is an exploded view of a tire pressure gauge according to a first embodiment of the present invention.
Figure 3:
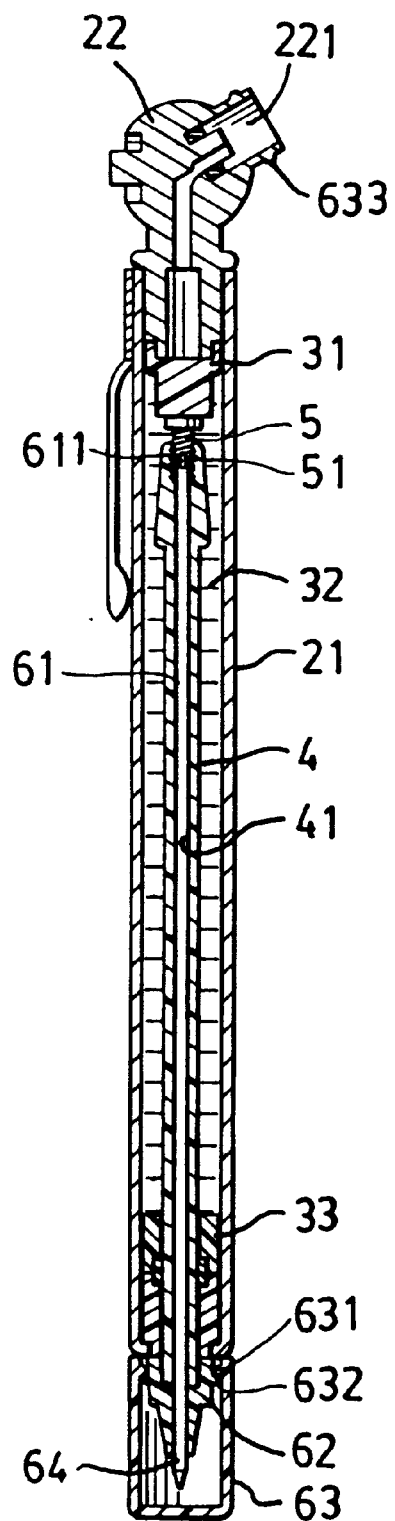
FIG. 3 is a sectional view of the tire pressure gauge of FIG. 2.

Referring to FIGS. 2 and 3, a first embodiment of the present invention is shown to comprise a tubular housing 21, a pressure-responsive mechanism 3, a plunger or graduated and elongated pressure indicator 4, an adjustable extension member 5 and a pen unit 6.

The tubular housing 21 has a first end connected with a pressure measuring head 22 which is provided with a pressure inlet hole 221 in fluid communication with the interior of the tubular housing 21.

The pressure-responsive mechanism 3 includes a piston 31 movably disposed inside the tubular housing 21 for moving longitudinally in response to a pressure entering the tubular housing 21 through the pressure inlet hole 221, a spring 32 for biasing the piston 31 towards the pressure hole 221, and a hollow guide 33 disposed at a second end of the tubular housing 21 opposite to the first end. The spring 32 extends between the piston 31 and the hollow guide 33.

The graduated and elongated pressure indicator 4 has a rectangular cross-section and is provided with graduation marks on its outer surface. The pressure indicator 4 is hollow to form a through-bore 41 which extends from a driven end 43 disposed adjacent to the piston 31 to a guided end 42 of the pressure indicator 4. The guided end 42 passes through the hollow guide 33 and extends out of the tubular housing 21.

The hollow guide 33 includes two guide pieces 34 which have guide holes 35 of rectangular cross-section for passage of the pressure indicator 4. Since the pressure indicator 4 is also rectangular in cross-section, it is prevented from rotation by the guide pieces 34. A friction ring 36 is provided inside the guide pieces 34 for friction contact with the pressure indicator 4, thereby preventing the pressure indicator 4 from escaping from the tubular housing 21 while permitting the same to move longitudinally relative to the hollow guide 33 in response to a detected pressure.

The adjustable extension member 5 is connected to the driven end 43 of the pressure indicator 4 and abuts against the piston 31. In this preferred embodiment, the adjustable extension member 5 is formed as a headed screw member 50 which is threaded into the driven end 43 of the pressure indicator 4. A portion the headed screw member 50, which extends into the driven end 43, is provided with a diametrical groove 51.

The pen unit 6 includes a slender pen element 61 which is inserted into the through-bore 41 of the pressure indicator 4. The pen element 61 has a writing end 64 which extends outwardly of the guided end 42 of the pressure indicator 4 and which is positioned relative to the guided end 42 via a positioning seat 62 that engages the rectangular guided end 42. The slender pen element 61 further has a turning end which is provided with an integral turning blade 611 for engagement with the diametrical groove 51 of the headed screw member 50. A pen cap 63 is provided for attachment to the positioning seat 62 so as to cover the writing end 64. The inner surface of the pen cap 63 is provided with engaging ribs 631 for releaseably interlocking an annular engaging rib 632 formed on the positioning seat 62. The pen cap 63 can also be attached to the pressure measuring head 22 via engagement between the engaging ribs 631 of the pen cap 63 and an annular rib 633 formed on the pressure measuring head 22, when the writing end 64 is in use.

In the aforementioned construction, the headed screw 50 can be turned relative to the pressure indicator 4 so as to adjust the length of a portion of the pressure indicator 4 which extends out of the second end of the tubular housing 21 under a certain pressure. In other words, if the force of the spring 3 as produced deviates from the standard value that is preset during its production, the pressure indicator 4 can be adjusted to a proper position relative to a pressure reading point of the pressure gauge, i.e. the pointing end or the second end of the tubular housing 21 where the detected pressure value is read.

For adjustment, the headed screw member 5 can be turned relative to the pressure indicator 4 by rotating the head of the headed screw member 5 before assembly, or by rotating the writing end 64 of the slender pen element 61 after assembly. The construction as described is convenient because the pressure indicator 4 and the related components need not be disassembled, after assembly, for correcting the position of the pressure indicator 4. Another advantage of this embodiment is that the pen cap 63 need not be detached from the pressure gauge in reading a detected pressure since the pen cap 63 is connected to the pressure indicator 4 rather than the tubular housing 21.

Figure 4:
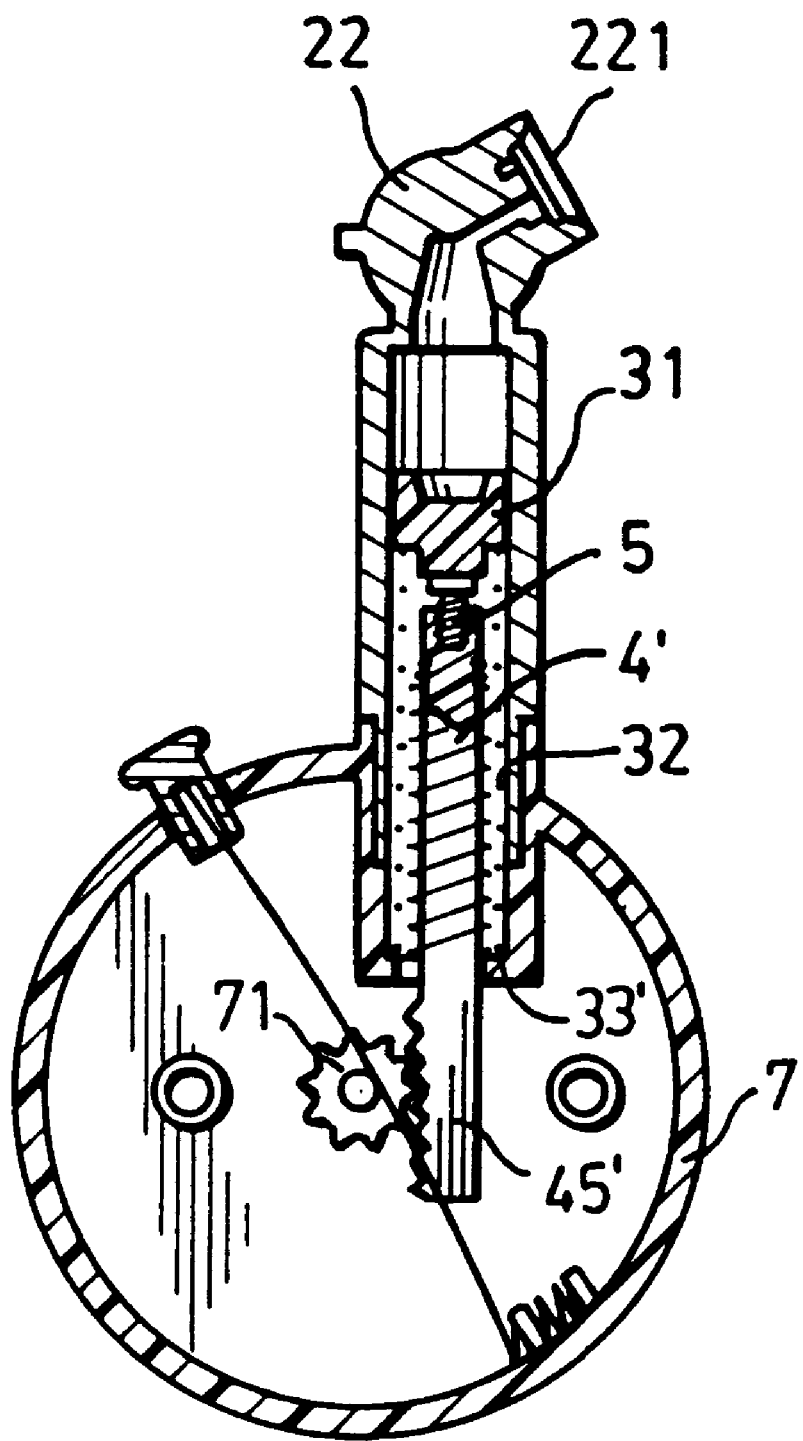
FIG. 4 is a schematic sectional view of a tire pressure gauge of a second embodiment of the present invention.

FIG. 4 shows a second embodiment of the present invention and includes reference numerals which are like those shown in FIGS. 2 and 3 so as to represent like elements. The second embodiment differs from the first embodiment in that it includes a dial member 7 in place of the pen unit 6. This embodiment includes a plunger 4' which is not hollow and graduated and which is rotatable relative to the headed screw member 5, and a hollow guide member 33' for adjustment and correction. The plunger 4' further has a toothed portion 45' to engage a pinion 71 which is used to turn a pointer (not shown) of the dial member 7. The dial member 7 is provided with graduations. Since the construction and operation of the dial member 7 are known, the details thereof will be omitted herein.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What I claim is:

1. A tire pressure gauge comprising:

a tubular housing having a first end and a second end;

a pressure measuring head connected to said first end and having a pressure inlet hole communicated with said tubular housing;

a piston mounted movably inside said tubular housing adjacent to said pressure inlet hole for longitudinal movement in response to a pressure introduced through said pressure inlet hole;

a fixed hollow guide disposed at said second end of said tubular housing;

a plunger extending longitudinally in said tubular housing and having a driven end disposed adjacent to said piston to be driven by said piston, said plunger further having a guided end extending through said hollow guide and out of said second end of said tubular housing;

an adjustable extension member disposed between said driven end and said piston and connected to said driven end for adjusting and correcting the length of said plunger that extends out of said second end of said tubular housing; and a spring mounted inside said tubular housing around said plunger between said piston and said hollow guide for biasing said piston towards said pressure inlet hole.

2. The tire pressure gauge as claimed in claim 1, wherein said adjustable extension member comprises a headed screw member which has a portion threadedly inserted into said driven end of said plunger.

3. The tire pressure gauge as claimed in claim 2, wherein said plunger is graduated and hollowed to form a through-bore which extends from said driven end to said guided end, said headed screw member having a portion threaded into said driven end.

4. The tire pressure gauge as claimed in claim 3, further comprising a slender element which is inserted into said through-bore and which has a turning end engaging said portion of said headed screw member, said portion of said headed screw member being provided with a diametrical groove to engage said turning end, said slender element further having a part which extends outwardly of said guided end of said plunger.

5. The tire pressure gauge as claimed in claim 4, wherein said slender element is a pen element, said part of said slender element having a writing end.

6. The tire pressure gauge as claimed in claim 4, wherein said guided end of said plunger has a rectangular cross-section, said hollow guide having a guide hole of rectangular cross-section to engage said guided end, thereby preventing said plunger from rotation.

7. The tire pressure gauge as claimed in claim 5, further comprising a positioning seat that couples said writing end with said guided end of said plunger, and a pen cap attached removably to said positioning seat.

\* \* \* \* \*